(12) United States Patent
Khavari

(10) Patent No.: US 8,722,167 B2
(45) Date of Patent: *May 13, 2014

(54) IMAGE RECORDING MEDIA, METHODS OF MAKING IMAGE RECORDING MEDIA, IMAGING LAYERS, AND METHODS OF MAKING IMAGING LAYERS

(75) Inventor: Mehrgan Khavari, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 645 days.

This patent is subject to a terminal disclaimer.

(21) Appl. No.: 12/999,244

(22) PCT Filed: Jun. 25, 2008

(86) PCT No.: PCT/US2008/068085
§ 371 (c)(1),
(2), (4) Date: Dec. 15, 2010

(87) PCT Pub. No.: WO2009/157924
PCT Pub. Date: Dec. 30, 2009

(65) Prior Publication Data
US 2011/0085436 A1   Apr. 14, 2011

(51) Int. Cl.
*G11B 7/24* (2013.01)
*G11B 7/246* (2013.01)
*G11B 7/24038* (2013.01)
*B41M 3/00* (2006.01)

(52) U.S. Cl.
CPC ............ *G11B 7/246* (2013.01); *G11B 7/24038* (2013.01); *B41M 3/001* (2013.01); *B41M 3/003* (2013.01)
USPC .... 428/64.1; 428/64.4; 428/64.8; 430/270.14

(58) Field of Classification Search
CPC .............................. G11B 7/246; G11B 7/24038
USPC ...................................... 428/64.4; 430/270.14
See application file for complete search history.

(56) References Cited

U.S. PATENT DOCUMENTS

| | | | |
|---|---|---|---|
| 6,022,648 | A | 2/2000 | Jacobson et al. |
| 6,251,571 | B1 | 6/2001 | Dessauer et al. |
| 6,974,661 | B2 | 12/2005 | Gore et al. |
| 7,060,654 | B2 | 6/2006 | Kasperchik et al. |
| 7,135,431 | B2 | 11/2006 | Iwasaki et al. |
| 7,235,292 | B2 | 6/2007 | Hayashida et al. |
| 7,270,943 | B2 | 9/2007 | Muryama et al. |
| 7,314,704 | B2 | 1/2008 | Gore et al. |
| 7,384,676 | B2 | 6/2008 | Hongo et al. |
| 2004/0146812 | A1 | 7/2004 | Gore et al. |
| 2005/0053863 | A1 | 3/2005 | Gore |
| 2005/0089782 | A1 | 4/2005 | Kasperchik et al. |
| 2005/0100817 | A1 | 5/2005 | Kasperchik et al. |
| 2005/0244741 | A1 | 11/2005 | Kasperchik et al. |
| 2005/0277070 | A1 | 12/2005 | Kasperchik et al. |
| 2006/0009356 | A1 | 1/2006 | Muryama et al. |
| 2006/0121234 | A1 | 6/2006 | Field et al. |
| 2006/0147833 | A1 | 7/2006 | Kasperchik et al. |
| 2006/0275693 | A9 | 12/2006 | Kasperchik et al. |
| 2007/0015092 | A1 | 1/2007 | Gore et al. |

(Continued)

FOREIGN PATENT DOCUMENTS

WO   WO2004067289 A1   8/2004

*Primary Examiner* — Elizabeth Mulvaney

(57) ABSTRACT

Imaging layers, optical disks, and methods of preparation of each, are disclosed.

14 Claims, 4 Drawing Sheets

(56) References Cited

U.S. PATENT DOCUMENTS

| | | |
|---|---|---|
| 2007/0037088 A1 | 2/2007 | Kasperchik et al. |
| 2007/0048487 A1 | 3/2007 | Risch et al. |
| 2007/0065623 A1 | 3/2007 | Kasperchik et al. |
| 2007/0065749 A1 | 3/2007 | Kasperchik et al. |
| 2007/0092827 A1 | 4/2007 | Gore et al. |
| 2007/0105039 A1 | 5/2007 | Kasperchik et al. |
| 2007/0188579 A1 | 8/2007 | Kasperchik et al. |
| 2007/0212639 A1 | 9/2007 | Kasperchik et al. |
| 2007/0243354 A1 | 10/2007 | Bailey et al. |
| 2007/0248918 A1 | 10/2007 | Kasperchik et al. |
| 2007/0281244 A9 | 12/2007 | Kasperchik et al. |
| 2008/0124655 A1 | 5/2008 | Kasperchik et al. |
| 2008/0145588 A1 | 6/2008 | Kasperchik et al. |
| 2009/0092922 A1* | 4/2009 | Khavari et al. ............ 430/270.15 |
| 2011/0085435 A1* | 4/2011 | Reboa et al. .................. 369/283 |

* cited by examiner

IMAGE RECORDING MEDIA, METHODS OF MAKING IMAGE RECORDING MEDIA, IMAGING LAYERS, AND METHODS OF MAKING IMAGING LAYERS

BACKGROUND

Compositions that produce a color change upon exposure to energy in the form of light are of great interest in producing images on a variety of substrates. For example, labeling of optical storage media such as Compact Discs, Digital Video Discs or Blue Laser Discs (CD, DVD, or Blue Laser Disc) can be routinely accomplished through screen-printing methods. While this method can provide a wide variety of label content, it tends to be cost ineffective for run lengths less than 300-400 discs because the fixed cost of unique materials and set-up are shared by all the discs in each run. In screen-printing, a stencil of the image is prepared, placed in contact with the disc and then ink is spread by squeegee across the stencil surface. Where there are openings in the stencil the ink passes through to the surface of the disc, thus producing the image. Preparation of the stencil can be an elaborate, time-consuming and expensive process.

In recent years, significant increases in use of CD/DVD discs as a data distribution vehicle have increased the need to provide customized label content to reflect the data content of the disc. For these applications, the screen-label printing presents a dilemma as discs are designed to permit customized user information to be recorded in standardized CD, DVD, or Blue Laser Disc formats. Today, for labeling small quantities of discs, popular methods include hand labeling with a permanent marker pen, using an inkjet printer to print an adhesive paper label, and printing directly with a pen on the disc media which has a coating that has the ability to absorb inks. The hand printing methods do not provide high quality and aligning a separately printed label by hand is inexact and difficult.

It may therefore be desirable to design an optical data recording medium (e.g., CD, DVD, or Blue Laser Disc) that can be individually labeled by the user easily and inexpensively relative to screen-printing while giving a high quality label solution. It may also be desirable to design an optical data recording medium that accepts labeling via multiple methods, thus reducing the amount of inventory necessarily carried by optical data recording merchants and end users.

Current technologies require long labeling times to produce images on the optical data recording medium. Thus, there is a need for chemistries that can be used to produce shorter labeling times.

SUMMARY

Briefly described, embodiments of this disclosure include optical disks, imaging layers, methods for preparing an optical disk including an imaging layer, and the like. One exemplary embodiment of the optical disk, among others, includes: a substrate having a first side and a second side, wherein the first side stores digital data, wherein the second side includes an imaging layer, wherein the imaging layer includes: a matrix; a radiation-absorbing compound; an activator; a surface additive; and a color former.

One exemplary embodiment of the method for preparing an optical disk including an imaging layer, among others, includes: providing a matrix; mixing a radiation-absorbing compound, an activator, a surface additive, and a color former, in the matrix to form a matrix mixture; and disposing the matrix mixture onto a substrate to form the imaging layer.

One exemplary embodiment of the imaging layer, among others, includes: a matrix including a monoacrylate and a diacrylate, wherein the monoacrylate is about 13 to 45 wt % of the imaging layer, wherein the diacrylates is about 2 to 33 wt % of the imaging layer; a radiation-absorbing compound, wherein the radiation-absorbing compound has a solubility of at least 2% by weight in the matrix; an activator; a surface additive, wherein the surface additive is selected from: silicon based surfactants, silicone free additives, additives having repeat units of dimethyl siloxane, which is acrylate capped on both ends, or combinations thereof, wherein the surface additive is about 0.01 wt % to 10 wt % of the imaging layer; and a color former.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Figure 1:
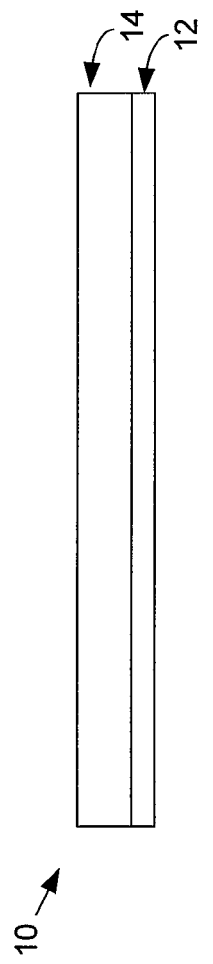
FIG. 1 illustrates an illustrative embodiment of the imaging medium.

Embodiments of the present disclosure will employ, unless otherwise indicated, techniques of synthetic organic chemistry, ink chemistry, media chemistry, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the term "leuco-dye" means a color-forming substance that is colorless or of a first color in a non-activated state, and subsequently exhibits color or changes from the first color to a second color in an activated state.

As used herein, the term "activator" is a substance that reacts with a color former such as a leuco-dye, causing the leuco-dye to alter its chemical structure and change or acquire color.

As used herein, the term "antenna" is a radiation-absorbing compound. The antenna readily absorbs a desired specific wavelength of the marking radiation.

Discussion

Embodiments of the disclosure include imaging layers, optical disks, and methods of making each. The optical disk includes an imaging layer or coating including, but not limited to, a matrix, a color former, an activator, a surface additive, and optionally a radiation-absorbing compound. The imaging layer can be a coating disposed onto a substrate to form an optical disk.

Embodiments of the present disclosure are advantageous for one or more of the following reasons. In an embodiment, the labeling time for the imaging layer has decreased from about 20-24 minutes to just under 14 minutes. In particular, during the screen-printing process air bubbles are formed in the imaging layer. The air-bubbles or the surface created by the broken air bubbles causes the surface of the substrate (CD or DVD) to be rough. The rough surface increases the time for the laser to find focus on the surface during the labeling process, which results in increase labeling times. The imaging layer including the surface additive decreases the roughness of the surface, thus decreasing focus time and consequently the labeling time. Selection of the right surface additive has an impact on obtaining a smooth surface. Some surface additives, however, have a negative or no effect on the surface roughness resulting in no change in print time and thus should be avoided. For example, an imaging layer with no surface additive with a print time of over 20 minutes, has as much as 10 to 20 microns in thickness range (peak to valley difference). On the other hand, a properly-tuned imaging layer containing a suitable surface additive with a print time of less than 14 minutes could have up to about 2 microns in thickness range (peak to valley difference). Additional details regarding embodiments of the present disclosure are described below and in the Examples.

A clear mark and excellent image quality can be obtained by directing radiation energy (e.g., a 780 nm laser operating at 40-45 mW) at areas of the imaging layer on which a mark is desired. As mentioned above, the components in the imaging layer used to produce the mark via a color change upon stimulation by energy can include, but are not limited to, the matrix, the color former (e.g., a leuco dye), the activator, the surface additive and, optionally, the radiation-absorbing compound. In an embodiment, the components can be dissolved into a matrix material. In another embodiment, one or more components can be insoluble or substantially insoluble in the matrix material at ambient temperatures, where the components are uniformly dispersed throughout the matrix material.

In an embodiment, when the radiation-absorbing compound absorbs a particular radiation energy, the heat generated from the radiation-absorbing compound allows a reaction between the color former and the activator to occur to produce a color change (e.g., a mark). In another embodiment, the radiation-absorbing compound is not used and the laser irradiation is directly absorbed by the imaging layer and heats the matrix material and its components, which allows the color former and the activator to react to produce a color change.

The radiation energy absorber functions to absorb radiation energy, convert the energy into heat, and deliver the heat to the components of the matrix. The radiation energy may then be applied by way of an infrared laser. Upon application of the radiation energy, both the color former and the activator may become heated and mix, which causes the color former to become activated and cause a mark (color) to be produced.

FIG. 1 illustrates an embodiment of an imaging medium 10, in particular, an optical disk. The imaging medium 10 can include, but is not limited to, a substrate 12 and an imaging layer 14. The substrate 12 can be a substrate upon which it is desirable to make a mark, such as, but not limited to, an optical disk (e.g., a compact disk (CD) (e.g., CD-R/RW/ROM) and a digital versatile disk (DVD) (e.g., DVD-R/RW/ROM). In particular, the substrate 12 includes an "optical disk" or "optical data recording medium" which is meant to include digital information such as audio, video, multi-media, and/or software disks that are machine readable in a CD and/or DVD drive, or the like. The substrate 12 includes a data side (not shown) (typically the side opposite the layer 14) that includes one or more data layers that encode information such as, but not limited to, audio, video, pictures, music, computer code, combinations thereof, and the like. Examples of optical disk formats include writeable, recordable, and rewriteable disks such as DVD-HD, Blu-ray, DVD, DVD-R, DVD-RW, DVD+R, DVD+RW, DVD-RAM, CD, CD-ROM, CD-R, CD-RW, and the like. Other like formats can also be included, such as similar formats and formats to be developed in the future.

The imaging layer 14 can include, but is not limited to, the matrix, the color former (e.g., a leuco dye), the activator, the surface additive, and optionally the radiation-absorbing compound, as well as other components typically found in the particular media to be produced.

The imaging layer 14 may be applied to the substrate 12 via any acceptable method, such as, but not limited to, rolling, spraying, and screen-printing. In addition, one or more layers can be formed between the imaging layer 14 and the substrate 12 and/or one or more layer can be formed on top of the imaging layer 14. In one embodiment, the imaging layer 14 is part of a CD or a DVD.

To form a mark, radiation energy is directed imagewise at one or more discrete areas of the imaging layer 14 of the imaging medium 10. The form of radiation energy may vary depending upon the equipment available, ambient conditions, the desired result, and the like. The radiation energy can include, but is not limited to, infrared (IR) radiation, ultraviolet (UV) radiation, and visible light. In an embodiment, the radiation-absorbing compound absorbs the radiation energy and heats the area of the imaging layer 14 to which the radiation energy impacts. The heat may cause the color former and the activator to mix. The color former and the activator may then react to form a mark (color) on certain areas of the imaging layer 14.

Figure 2:
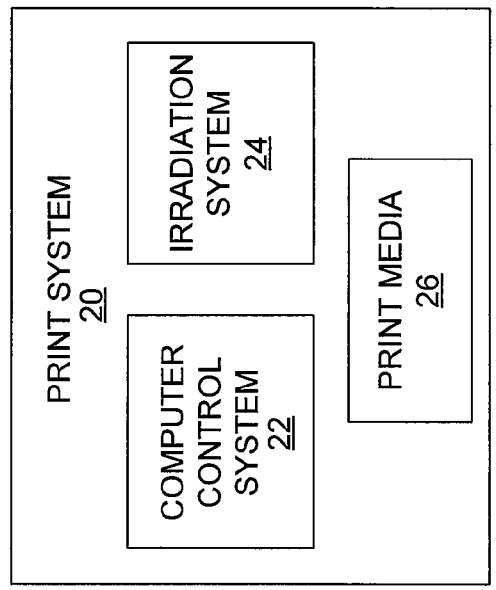
FIG. 2 illustrates a representative embodiment of a printer system.

FIG. 2 illustrates a representative embodiment of a print system 20. The print system 20 can include, but is not limited to, a computer control system 22, an irradiation system 24, and print media 26 (e.g., imaging medium). The computer control system 22 is operative to control the irradiation system 24 to cause marks (e.g., printing of characters, symbols, photos, and the like) to be formed on the print media 26. The irradiation system 24 can include, but is not limited to, a laser system, an UV energy system, an IR energy system, a visible energy system, a x-ray system, and other systems that can produce radiation energy to cause a mark to be formed on the imaging layer 14. The print system 20 can include, but is not limited to, a laser printer system and an ink-jet printer system.

In an embodiment, the print system 20 can be incorporated into a digital media system. For example, the print system 20 can be operated in a digital media system to print labels (e.g., the layer is incorporated into a label) onto digital media such as CDs and DVDs. Furthermore, the print system 20 can be operated in a digital media system to directly print onto the digital media (e.g., the layer is incorporated the structure of the digital media).

As mentioned above, the imaging layer can include, but is not limited to, the matrix, the color former (e.g., a leuco dye), the activator, the surface additive, and optionally the radiation-absorbing compound. These components can be mixed to form a matrix mixture.

In an embodiment, the surface additive can include chemicals such as, but not limited to, silicon based surfactants (e.g., Foamblast® F20 (polydimethylsiloxane-fumed silica compound), silicone free additive (e.g., BYK 1790 (mixture of foam destroying hydrocarbon-based polymers)), an additive having repeat units of dimethyl siloxane (e.g., 10 on average), which is acrylate capped on both ends (Silmer ACR Di-10 (Siltech) (di-acrylated polydimethylsiloxane additive), and combinations thereof. In addition, the surface additive can include, but is not limited to, the series of Tego products from Evonik Industries) like, Foamex N, Foamex 810, Airex 900, Airex 920, Airex 950 containing modified siloxane chemistry. Other alternatives from BYK are BYK®-020, BYK®-067A and BYK®-088, as examples are silicone-based additives and BYK®-052, BYK®-A 501, BYK®-354, BYK 1790, as examples of silicone-free additives.

Silicon-based additives are those additives that contain, at least, polydimethylsiloxane in the chemical structure of the additives as the backbone or side-chain attached to the backbone of the polymer. Other chemical groups or pendants such as polyethers, polyesters, carboxylic, amines, and polyamides could also be a part of the chemical structure as modifiers.

Silicone-free additives refers to those additives that are primarily hydrocarbon based containing no siloxane groups. Examples include, but not limited to, polyhydrocarbons, polyacrylics, polyethers, polyesters, polyamides, polyvinylalcohols, polyvinylbutyrol, and combinations thereof.

In an embodiment, the surface additive polymer, such as a polydimethylsiloxane or a polyacrylic, is composed of monomeric repeat units (dimethylsiloxane or acrylic, respectively), and the repeat units are less than about 10,000 or less than about 1000.

In an embodiment, the following reactive groups or modifiers can be use to modify the surface additives noted above to produce a product that can be used as a surface additive: alkyl polyethylene oxides, alkyl phenyl polyethylene oxides, polyethylene oxide (PEO) block copolymers, acetylenic PEO, PEO esters, PEO amines, PEO amides, and dimethicone copolyols.

In an embodiment, the surface additive can be about 0.01 wt % to 10 wt % of the imaging layer. In another embodiment, the surface additive can be about 0.1 wt % to 5 wt % of the imaging layer. In another embodiment, the surface additive can be about 0.1 wt % to 2 wt %. In another embodiment, the surface additive can be about 0.1 wt % to 1.5 wt % of the imaging layer.

In an embodiment, the surface additive is a mixture of silica and polydimethylsiloxane in the ratio of about 0.01 to 2 wt % of silica to total weight (Foamblast® F20) and the mixture can be about 0.8 wt % to 1.4 wt % of the imaging layer. In an embodiment, the surface additive is a mixture of a foam destroying (i.e., substantially reduces or eliminates foam) hydrocarbon-based polymer (BYK 1790) and can be about 0.8 wt % to 1.4 wt % of the imaging layer. In an embodiment, the surface additive is a di-acrylated polydimethylsiloxane (Silmer ACR Di-10) and can be about 0.8 wt % to 1.4 wt % of the imaging layer.

The matrix (also referred to as "matrix material", "matrix compound", and "lacquer") can include one or more compounds capable of and suitable for dissolving and/or dispersing the radiation-absorbing compound, the activator, and/or the color former. The matrix can include a mixture of mono-functional monomers (also referred to as "monoacrylates"), and difunctional monomers or oligomers (also referred to as "diacrylates"). The use of monoacrylates and diacrylates increases the solubility of the radiation-absorbing compound (e.g., about 1 to 4% or more) and the activator (e.g., about 1 to 5% or more). In addition, the use of monoacrylates and diacrylates to make the matrix reduces the amount of cross-linking among the monoacrylates and diacrylates. In this regard, the activator can diffuse at a faster rate to react with the color former. As a result of these advantages, the labeling time for the imaging layer has decreased to under 14 minutes or under 10 minutes.

The monoacrylates can be about 25 to 95 wt %, about 50 to 85 wt %, about 75 to 85 wt %, or about 80% of the matrix. The diacrylates can be about 5 to 65 wt %, about 10 to 45 wt %, about 12 to 25 wt %, or about 20 wt % of the matrix. The monoacrylates can be about 13 to 45 wt %, about 25 to 43 wt %, about 37 to 43 wt %, or about 40 wt % of the imaging layer. The diacrylates can be about 2 to 33 wt %, about 5 to 23 wt %, or about 6 to 13 wt % of the imaging layer.

The monoacrylate is selected from a monofunctional isobornyl acrylate (e.g., SR506, (1S,2R,4R)-1,7,7-trimethyl-bicyclo[2.2.1]heptan-2-yl acrylate), a monofunctional ester amine acrylate (e.g., Ebecryl 1040, 2-(acryloyloxy)ethyl butylcarbamate), a monofunctional trimethyl cyclohexane acrylate (e.g., CD420, 2,5,5-trimethylcyclohexyl acrylate), or a combination thereof. In an embodiment, the monofunctional isobornyl acrylate can be about 40 to 60 wt % or about 55 wt % of the matrix. In an embodiment, the monofunctional ester amine acrylate can be about 15 to 30 wt % or about 25 wt % of the matrix.

The diacrylate is selected from tricyclodecane dimethanol diacrylate ((SR833S), and bisphenol A epoxy diacrylate (Ebecryl 605), and combinations thereof. In an embodiment, the tricyclodecane dimethanol diacrylate (SR833S) can be about 8 to 12 wt % or about 10 wt % of the matrix. In an embodiment, the epoxy diacrylate (Ebecryl 605) can be about 1 to 3 wt % or about 2 wt % of the matrix.

In an embodiment, a long chain polymer is added to the matrix to enhance gloss, printability, and reduce fade. In an embodiment, the long chain polymer is a poly-acrylic acid (Paraloid B-60) and can be about 6 to 10 wt % or about 8 wt % of the matrix.

In addition, the matrix can include, but is not limited to, monoacrylate, and diacrylate, with a photopackage. A photopackage may include light absorbing species that initiate reactions for curing of a lacquer, such as, by way of example, benzophenone derivatives. Other examples of photoinitiators for free radical polymerization monomers and pre-polymers include, but are not limited to, thioxanethone derivatives, anthraquinone derivatives, α-hydroxyketones, α-aminoketones, acetophenones and benzoine ethers. In an embodiment, the photoinitiator is a blend of 2-hydroxy-2-methyl-1-phenyl-1-propanone and 2-benzyl-2-(dimethylamino)-1-[4-(4-morpholinylphenyl)-1-butanone in a 70:30 ratio and is about 6 to 8 wt % and about 7 wt % of the imaging layer. In another embodiment, the photoinitiator is a blend of oligomeric (2-hydroxy-2-methyl-1-4(1-methylvinyl) propanone and monomeric 2-hydroxy-2-methyl-1-phenylpropan-1-one and can be about 6 to 8 wt % or about 7 wt % of the imaging layer.

The matrix 16 can be about 40 wt % to 60 wt % or about 46 wt % to 52 wt % of the imaging layer. The matrix can be mixed to dissolve the components for a period of about 2 to 3 hours at about 60° C.

In an embodiment, the matrix can include an acid developer such as, but not limited to, 4,4'-sulfonyldiphenol acid developer (SDP), 4-(4-ethylphenylsulfonyl)phenol (D8), 1-(4-(phenylsulfonyl)phenyl)-3-tosylurea (Pergafast 201), 4-(4-hydroxy-5-isopropyl-2-methyl phenylthio)-2-isopropyl-5-methylphenol (YSR Yoshinox SR), and combinations thereof. The acid developer can be about 8 to 18 wt % of the imaging layer. The acid developer can be added after the other components of the matrix are mixed. In particular, the matrix can be mixed an additional about 1 to 2 hours to dissolve the acid developer.

It should also be noted that matrix can include other additives such as, but not limited to, a surfactant, defoamer, or surface additive.

Embodiments of the matrix can include a photoinitiator. The photoinitiator can be selected from: Irgacure 369 (2-Benzyl-2-(dimethylamino)-1-[4-4-morpholinyl]phenyl-)-1-butanone), Irgacure 379 (2-Dimethylbenzene-2-(dimethylamino)-1-[4-4-morpholinyl]phenyl-)-1-butanone), Darocure 173 (2-Hydroxy-2-methyl-1-phenyl-1-propanone, Esacure KL200 (equivalent to Darocure 1173), Esacure KIP150 (solid blend of oligomeric (2-hydroxy-2-methyl-1-4 (1-methylvinyl) propanone and monomeric 2-hydroxy-2-methyl-1-phenyl propan-1-one), Esacure KIP100F (liquid blend of oligomeric (2-hydroxy-2-methyl-1-4(1-methylvinyl) propanone and monomeric 2-hydroxy-2-methyl-1-phenyl propan-1-one at a 70:30 ratio), and combinations thereof. The photoinitiator is about 6 to 8 wt % of the imaging layer.

The term "color former" is a color forming substance, which is colorless or one color in a non-activated state and produces or changes color in an activated state. The color former can include, but is not limited to, leuco dyes and phthalide color formers (e.g., fluoran leuco dyes and phthalide color formers as described in "The Chemistry and Applications of Leuco Dyes", Muthyala, Ramiah, ed., Plenum Press (1997) (ISBN 0-306-45459-9), incorporated herein by reference).

The color former can include a wide variety of leuco dyes. Suitable leuco dyes include, but are not limited to, fluorans, phthalides, amino-triarylmethanes, aminoxanthenes, aminothioxanthenes, amino-9,10-dihydro-acridines, aminophenoxazines, aminophenothiazines, aminodihydro-phenazines, aminodiphenylmethanes, aminohydrocinnamic acids (cyanoethanes, leuco methines) and corresponding esters, 2(p-hydroxyphenyl)-4,5-diphenylimidazoles, indanones, leuco indamines, hydrozines, leuco indigoid dyes, amino-2,3-dihydroanthraquinon-es, tetrahalo-p,p'-biphenols, 2(p-hydroxyphenyl)-4,5-diphenylimidazoles, phenethylanilines, phthalocyanine precursors (such as those available from Sitaram Chemicals, India), and other known leuco dye compositions. Experimental testing has shown that phthalide and fluoran-based dyes are one class of leuco dyes that exhibit particularly desirable properties.

In one aspect of the present disclosure, the leuco dye can be a fluoran, phthalide, aminotriarylmethane, or mixture thereof. Several non-limiting examples of suitable fluoran based leuco dyes include 3-diethylamino-6-methyl-7-anilinofluorane, 3-(N-ethyl-p-toluidino)-6-meth-yl-7-anilinofluorane, 3-(N-ethyl-N-isoamylamino)-6-methyl-7-anilinofluorane, 3-diethylamino-6-methyl-7-(o,p-dimethylanilino)fluorane, 3-pyrrolidino-6-methyl-7-anilinofluorane, 3-piperidino-6-methyl-7-anilinofluorane, 3-(N-cyclohexyl-N-methylamino)-6-methyl-7-anilinofluorane, 3-diethylamino-7-(m-trifluoromethylanilino)fluorane, 3-dibutylamino-6-methyl-7-anilinofluorane, 3-diethylamino-6-chloro-7-anilinofluorane, 3-dibutylamino-7-(o-chloroanilino)fluorane, 3-diethylamino-7-(o-chloroanilino)fluorane, 3-di-n-pentylamino-6-methyl-7-anilinofluoran, 3-di-n-butylamino-6-methyl-7-anilinofluoran, 3-(n-ethyl-n-isopentylamino)-6-methyl-7-anilinofluoran, 3-pyrrolidino-6-methyl-7-anilinofluoran, 1(3H)-isobenzofuranone,4,5,6,7-tetrachloro-3,3-bis[2-[4-(dimethylamino)phenyl]-2-(4-methoxyphenyl)ethenyl]-, 2-anilino-3-methyl-6-(N-ethyl-N-isoamylamino)fluorane (S-205 available from Nagase Co., Ltd), and mixtures thereof. Suitable aminotriarylmethane leuco dyes can also be used in the present invention such as tris(N,N-dimethylaminophenyl)methane (LCV); tris(N,N-diethylaminophenyl) methane (LECV); tris(N,N-di-n-propylaminophenyl)methane (LPCV); tris(N,N-di-n-butylaminophenyl) methane (LBCV); bis(4-diethylaminophenyl)--(4-diethylamino-2-methylphenyl)methane (LV-1); bis(4-diethylamino-2-methylphenyl)-(4-diethylaminophenyl)methane (LV-2); tris(4-diethylamino-2-methylphenyl)methane (LV-3); bis(4-diethylamino-2-methylphenyl)(3,4-dimethoxyphenyl)methane (LB-8); aminotriarylmethane leuco dyes having different alkyl substituents bonded to the amino moieties wherein each alkyl group is independently selected from C1-C4 alkyl; and aminotriaryl methane leuco dyes with any of the preceding named structures that are further substituted with one or more alkyl groups on the aryl rings wherein the latter alkyl groups are independently selected from C1-C3 alkyl. Other leuco dyes can also be used in connection with the present disclosure and are known to those skilled in the art. A more detailed discussion of some of these types of leuco dyes may be found in U.S. Pat. Nos. 3,658,543 and 6,251,571, each of which is hereby incorporated by reference in their entireties. Additional examples and methods of forming such compounds can be found in Chemistry and Applications of Leuco Dyes, Muthyala, Ramaiha, ed., Plenum Press, New York, London; ISBN: 0-306-45459-9, which is hereby incorporated by reference.

The color former may exist in the imaging layer as either: a) as a separate phase finely dispersed in the matrix phase (preferable for many fluoran Leuco-dyes) (e.g., Leuco-dye particle size <5 μm, preferably <2 μm, most preferably <1 μm) (In this case heating of the coating by radiation results in melting and dissolution of the Leuco-dye dissolution in the matrix); b) or being completely dissolved in the matrix phase at the stage of coating preparation. For example, some of the commercial phthalide Leuco-dyes such as 3,3'-Bis(1-n-octyl-2-methylindol-3-yl) phthalide commercially known as Pergascript Red I 6B or Specialty Red 16 have relatively high solubility (up to about 20 wt. %) in many commercially available acrylate and methacrylate monomers.

The color former can be from about 2 wt % to 50 wt %, from about 5 wt % to 35 wt %, or about 20 to 35 wt % of the imaging layer. In an embodiment, the color former is spiro[isobenzofuran-1(3H),9'-[9H]xanthen]-3-one, 6'-(dibutylamino)-3'-methyl-2'-(phenylamino)-(ODB-2), and combinations thereof, where the color former is about 20 to 35 wt % of the imaging layer. In an embodiment, the color former is spiro[isobenzofuran-1(3H),9'-[9H]xanthen]-3-one, 6'-(dibutylamino)-3'-methyl-2'-(phenylamino)-(ODB-2), where the color former is about 25 to 28 wt % of the imaging layer.

As used herein, the term "activator" is a substance that reacts with a color former, causing the color former to alter its chemical structure and change or acquire color.

The activator can include a compound that has an acid such as, but not limited to, a Brönsted or a Lewis acid, has a functionality such as a complexed transition metal, metal salt, phenolic compound, and combinations thereof, and can be reactive with leuco dyes with or without introduction of energy in the form of light and/or heat. Most acids are salts or highly hydrogen-bonding, thus their melting point is high and diffusion to reaction is slow. It is preferable to have the activator acid be soluble in the matrix.

In one embodiment, the activator can be a metal salt of an aromatic carboxylic acid. The metal of the metal salt can include, but is not limited to, transition metals such as zinc, tin, nickel, iron, and other transition metals. In one embodiment, the metal salt activator can be a zinc salt of an aromatic carboxylic acid. Other metal salt activators include zinc salicylate, tin salicylate, zinc 2-hydroxy naphthoate, 3,5-di-α-methylbenzyl zinc salicylate, metal salts of rhodanate, xanthate, aluminate, titanate, and zirconate, and mixtures thereof.

The activator can include, but is not limited to, a phenolic resin, zinc chloride bisphenol, hydroxybenzoate, amidophenol, anilides with hydroxyl groups, and benzoamides with hydroxyl groups including N-(4-Hydroxyphenyl) acetamide, 2-acetamidophenol, 3-acetamidophenol, salicylanilide, p-hydroxybenzamide, p-hydroxyphenyl acetamide, 3-hydroxy-2-napthanilide, o-hydroxybenzanilide, 4-hydroxyphenyl sulfone, 2,4'-dihydroxydiphenyl sulfone, Bis(4-hydroxy-3-allylphenyl) sulfone, 2,2',5,5'-Tetrahydroxy diphenyl sulfone, 4-hydroxyphenyl-4'-isopropoxyphenly sulfone, 2,2-Bis(4-hydroxyphenyl)propane, and combinations thereof.

In an embodiment, the activator can include, but is not limited to, 4-(4-ethylphenylsulfonyl)phenol (D8 activator), Bisphenol-S acid developer (SDP) and combinations thereof.

The activator can be about 2 wt % to 20 wt %, about 10 wt % to 18 wt %, or about 8 wt % to 13 wt % of the imaging layer. In an embodiment, D8 is about 8 wt % to 13 wt % of the imaging layer.

The term "radiation-absorbing compound" (e.g., "an antenna") means any radiation-absorbing compound that readily absorbs a desired specific wavelength of the marking radiation. The radiation-absorbing compound can be a material that effectively absorbs the type of energy to be applied to the imaging medium 10 and converts it to heat to effect a mark or color change. The radiation-absorbing compound can have a solubility of at least 2%, at least 4%, at least 6%, at least 8%, about 2 to 8%, or about 6 to 8% by weight in the matrix.

The radiation-absorbing compound can act as an energy antenna, providing energy to surrounding areas upon interaction with an energy source. As a predetermined amount of energy can be provided by the radiation-absorbing compound, matching of the radiation wavelength and intensity to the particular antenna used can be carried out to optimize the system within a desired optimal range. Most common commercial applications can require optimization to a development wavelength of about 200 nm to 1000 nm, although wavelengths outside this range can be used by adjusting the radiation-absorbing compound and color forming composition accordingly.

Suitable radiation-absorbing compound can be selected from a number of radiation absorbers such as, but not limited to, aluminum quinoline complexes, porphyrins, porphins, indocyanine dyes, phenoxazine derivatives, phthalocyanine dyes, polymethyl indolium dyes, polymethine dyes, guaiazulenyl dyes, croconium dyes, polymethine indolium dyes, metal complex IR dyes, cyanine dyes, squarylium dyes, chalcogeno-pyryloarylidene dyes, indolizine dyes, pyrylium dyes, quinoid dyes, quinone dyes, azo dyes, and mixtures or derivatives thereof. Other suitable radiation-absorbing compounds can also be used and are known to those skilled in the art and can be found in such references as "Infrared Absorbing Dyes", Matsuoka, Masaru, ed., Plenum Press, New York, 1990 (ISBN 0-306-43478-4) and "Near-Infrared Dyes for High Technology Applications", Daehne, Resch-Genger, Wolfbeis, Kluwer Academic Publishers (ISBN 0-7923-5101-0), both incorporated herein by reference.

Various radiation-absorbing compounds can act as an antenna to absorb electromagnetic radiation of specific wavelengths and ranges. Generally, a radiation antenna that has a maximum light absorption at or in the vicinity of the desired development wavelength can be suitable for use in the present disclosure. For example, the color forming composition can be optimized within a range for development using infrared radiation having a wavelength from about 720 nm to 900 nm. Common CD-burning lasers have a wavelength of about 780 nm and can be adapted for forming images by selectively developing portions of the imaging layer.

Radiation-absorbing compound which can be suitable for use in the infrared range can include, but are not limited to, polymethyl indoliums, metal complex IR dyes, indocyanine green, polymethine dyes such as pyrimidinetrione-cyclopentylidenes, guaiazulenyl dyes, croconium dyes, cyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, hexafunctional polyester oligomers, heterocyclic compounds, and combinations thereof.

Several specific polymethyl indolium compounds are available from Aldrich Chemical Company and include 2-[2-[2-chloro-3-[2-(1,3-dihydro-1,3,3-trimethyl-2/-/-indol-2-ylidene)-ethylidene]-1-cyclopenten-1-yl-ethenyl]-1,3,3-trimethyl-3/-/-indolium perchlorate; 2-[2-[2-chloro-3-[2-(1,3-dihydro-1,3,3-trimethyl-2H-indol-2-ylidene)-ethylidene]-1-cyclopenten-1-yl-ethenyl]-1,3,3-trimethyl-3W-indolium chloride; 2-[2-[2-chloro-3-[(1,3-dihydro-3,3-dimethyl-1-propyl-2H-indol-2-ylidene) ethylidene]-1-cyclohexen-1-yl] ethenyl]-3,3-dimethyl-1-propylindolium iodide; 2-[2-[2-chloro-3-[(1,3-dihydro-1,3,3-trimethyl-2H-indol-2-ylidene) ethylidene]-1-cyclohexen-1-yl]ethenyl]-1,3,3-trimethylindolium iodide; 2-[2-[2-chloro-3-[(1,3-dihydro-1,3,v3-trim-ethyl-2H-indol-2-ylidene) ethylidene]-1-cyclohexen-1-yl] ethenyl]-1,3,3-trimethylindolium perchlorate; 2-[2-[3-[(1,3-dihydro-3,3-dimethyl-1-propyl-2H-indol-2-ylidene) ethylidene]-2-(phenylthio)-1-cyclohexen-1-yl]ethenyl]-3,3-dimethyl-1-propylindolium perchlorate; and mixtures thereof. Alternatively, the radiation-absorbing compound can be an inorganic compound (e.g., ferric oxide, carbon black, selenium, or the like). Polymethine dyes or derivatives thereof such as a pyrimidinetrione-cyclopentylidene, squarylium dyes such as guaiazulenyl dyes, croconium dyes, or mixtures thereof can also be used in the present invention. Suitable pyrimidinetrione-cyclopentylidene infrared antennae include, for example, 2,4,6(1H,3H,5H)-pyrimidinetrione 5-[2,5-bis[(1,3-dihydro-1,1,3-dimethyl-2H-indol-2-ylidene) ethylidene]cyclopentylidene]-1,3-dimethyl-(9Cl) (S0322 available from FEW Chemicals, Germany).

In another embodiment, the radiation-absorbing compound can be selected for optimization of the color forming composition in a wavelength range from about 600 nm to 720 nm, such as about 650 nm. Non-limiting examples of suitable radiation-absorbing compound for use in this range of wavelengths can include indocyanine dyes such as 3H-indolium, 2-[5-(1,3-dihydro-3,3-dimethyl-1-propyl-2H-indol-2- ylidene)-1,3-pentadienyl]-3,3-dimethyl-1-propyl-iodide) (Dye 724 Amax 642 nm), 3H-indolium,1-butyl-2-[5-(1-butyl-1,3-dihydro-3,3-dimethyl-2H-indol-2-ylidene)-1,3-pentadienyl]-3,3-dimethyl-perchlorate (Dye 683 $A_{max}$ 642 nm), and phenoxazine derivatives such as phenoxazin-5-ium, 3,7-bis(diethylamino)-perchlorate (oxazine 1 $A_{max}$=645 nm). Phthalocyanine dyes having an $A_{max}$ of about the desired development wavelength can also be used such as silicon 2,3-napthalocyanine bis(trihexylsilyloxide) and matrix soluble derivatives of 2,3-napthalocyanine (both commercially available from Aldrich Chemical); matrix soluble derivatives of silicon phthalocyanine (as described in Rodgers, A. J. et al., 107 J. Phys. Chem. A 3503-3514, May 8, 2003, which is incorporated herein by reference for the corresponding discussion), and matrix soluble derivatives of benzophthalocyanines (as described in Aoudia, Mohamed, 119 J. Am. Chem. Soc. 6029-6039, Jul. 2, 1997, which is incorporated herein by reference for the corresponding discussion); phthalocyanine compounds such as those described in U.S. Pat. Nos. 6,015,896 and 6,025,486, which are each incorporated herein by reference; and Cirrus 715 (a phthalocyanine dye available from Avecia, Manchester, England having an $A_{max}$=806 nm).

In another embodiment, laser light having blue and indigo wavelengths from about 300 nm to 400 nm can be used to develop the color forming compositions. Therefore, the present disclosure can provide color forming compositions optimized within a range for use in devices that emit wavelengths within this range. Recently developed commercial lasers found in certain DVD and laser disk recording equipment provide for energy at a wavelength of about 405 nm. Thus, using appropriate radiation-absorbing compound can be suited for use with components that are already available on the market or are readily modified to accomplish imaging. Radiation-absorbing compounds that can be useful for optimization in the blue (about 405 nm) and indigo wavelengths can include, but are not limited to, aluminum quinoline complexes, porphyrins, porphins, and mixtures or derivatives thereof. Non-limiting specific examples of suitable radiation antenna can include 1-(2-chloro-5-sulfophenyl)-3-methyl-4-(4-sulfophenyl)azo-2-pyrazolin-5-one disodium salt (X max=400 nm); ethyl 7-diethylaminocoumarin-3-carboxylate (X max=418 nm); 3,3'-diethylthiacyanine ethylsulfate (X max=424 nm); 3-allyl-5-(3-ethyl-4-methyl-2-thiazolinylidene) rhodanine (X max=430 nm) (each available from Organica Feinchemie GmbH Wolfen), and mixtures thereof. Non-limiting specific examples of suitable aluminum quinoline complexes can include tris(8-hydroxyquinolinato)aluminum (CAS 2085-33-8) and derivatives such as tris(5-cholor-8-hydroxyquinolinato)aluminum (CAS 4154-66-1), 2-(4-(1-methyl-ethyl)-phenyl)-6-phenyl-4H-thiopyran-4-ylidene)-propanedinitril-1,1-dioxide (CAS 174493-15-3), 4,4'[1,4-phenylenebis(1,3,4-oxadiazole-5,2-diyl)]bis N,N-diphenyl benzeneamine (CAS 184101-38-0), bis-tetraethylammonium-bis(1,2-dicyano-dithiolto)-zinc(II) (CAS 21312-70-9), 2-(4,5-dihydronaphtho[1,2-d]-1,3-dithiol-2-ylidene)-4,5-dihydro-naphtho[1,2-d]1,3-dithiole, all available from Syntec GmbH. Non-limiting examples of specific porphyrin and porphyrin derivatives can include etioporphyrin 1 (CAS 448-71-5), deuteroporphyrin IX 2,4 bis ethylene glycol (D630-9) available from Frontier Scientific, and octaethyl porphrin (CAS 2683-82-1), azo dyes such as Mordant Orange CAS 2243-76-7, Merthyl Yellow (60-11-7), 4-phenylazoaniline (CAS 60-09-3), Alcian Yellow (CAS 61968-76-1), available from Aldrich chemical company, and mixtures thereof.

Examples of antenna dyes suitable for imaging with 780 nm laser radiations include, but are not limited to:

a) IR-780 iodide, (Aldrich 42,531-1) (1) (3H-Indolium, 2-[2-[2-chloro-3-[(1,3-dihydro-3,3-dimethyl-1-propyl-2H-indol-2-ylidene)ethylidene]-1-cyclohexen-1-yl]ethenyl]-3,3-dimethyl-1-propyl-, iodide(9Cl)), b) IR783 (Aldrich 54,329-2) (2) (2-[2-[2-Chloro-3-[2-[1,3-dihydro-3,3-dimethyl-1-(4-sulfobutyl)-2H-indol-2-ylidene]-ethylidene]-1-cyclohexen-1-yl]-ethenyl]-3,3-dimethyl-1-(4-sulfobutyl)-3H-indoliumhydroxide, inner salt sodium salt).

c) 3H-Indolium, 2-[2-[2-chloro-3-[(1,3-dihydro-1,3,3-trimethyl-2H-indol-2-ylidene) ethylidene]-1-cyclopenten-1-yl]ethenyl]-1,3,3-trimethyl-, salt with 4-methylbenzenesulfonic acid (1:1)(9Cl)-(Lambda max—797 nm). CAS No. 193687-61-5. Available from "Few Chemicals GMBH" asS0337.

d) 3H-Indolium, 2-[2-[3-(1,3-dihydro-1,3,3-trimethyl-2H-indol-2-ylidene) ethylidene]-2-[(1-phenyl-1H-tetrazol-5-yl)thio]-1-cyclohexen-1-yl]ethenyl]-1,3,3-trimethyl-, chloride (9Cl). (Lambda max—798 nm). CAS No. 440102-72-7. Available from "Few Chemicals GMBH" as S0507.

e) 1H-Benz[e]indolium, 2-[2-[2-chloro-3-[(1,3-dihydro-1,1,3-trimethyl-2H-benz[e]indol-2-ylidene) ethylidene]-1-cyclohexen-1-yl]ethenyl]-1,1,3-trimethyl-, chloride (9Cl) (Lambda max—813 nm). CAS No. 297173-98-9. Available from "Few Chemicals GMBH" as S0391.

f) 1H-Benz[e]indolium, 2-[2-[2-chloro-3-[(1,3-dihydro-1,1,3-trimethyl-2H-benz[e]indol-2-ylidene) ethylidene]-1-cyclohexen-1-yl]ethenyl]-1,1,3-trimethyl-, salt with 4-methylbenzenesulfonic acid (1:1) (9Cl) (Lambda max—813 nm). CAS No. 134127-48-3. Available from "Few Chemicals GMBH" as S0094. Also known as Trump Dye or Trump IR.

g) 1H-Benz[e]indolium, 2-[2-[2-chloro-3-[(3-ethyl-1,3-dihydro-1,1-dimethyl-2H-benz[e]indol-2-ylidene) ethylidene]-1-cyclohexen-1-yl]ethenyl]-3-ethyl-1,1-dimethyl-, salt with 4-methylbenzenesulfonic acid (1:1) (9Cl) (Lambda max—816 nm). CAS No. 460337-33-1. Available from "Few Chemicals GMBH" as S0809.

In addition, the radiation absorbing compound can include phthalocyanine or naphthalocyanine IR dyes such as Silicon 2,3-naphthalocyanine bis(trihexylsiloxide) (CAS No. 92396-88-8) (Lambda max—775 nm).

In an embodiment, the radiation-absorbing compound can include, but is not limited to: copper, [2, 3, 9, 10, 16, 17, 23, 24-octkis[[4-1(1,1-dimethylethyl) phenyl]thio-1, 4, 8, 11, 15, 22, 25-octakis(2-ethoxyethoxy)-29H, 31H-phthalocyaninato (2-)kappaN29, kappaN30, kappaN31, kappaN32] (Yamamoto N700EX), Cirrus 715 from Avecia (Fuji) Chemicals, YKR-5010 available from Yamamoto Chemicals, and combinations thereof.

The radiation-absorbing compound can be from about 0.01 wt % to 10 wt %, about 0.1 wt % to 5 wt %, or about 0.8 wt % to 3.7 wt % of the imaging layer. In an embodiment, Yamamoto N700Ex can be about 1 wt % to 3.7 wt % of the imaging layer.

The matrix can be mixed with the other components for a period of about 2 to 4 hours at about 60° C. to form the composition to form the imaging layer. The mixed composition is disposed on a substrate and has a thickness of about 7 to 9 microns and is then cured to form embodiments of the present disclosure.

Having summarized embodiments, reference will now be made in detail to the illustrative Examples. While the disclosure is described in connection with the Examples, there is no intent to limit the embodiments of the disclosure to the following example. On the contrary, the intent is to cover all alternatives, modifications, and equivalents included within the spirit and scope of the disclosure.

EXAMPLE 1

The following is an illustrative example of an embodiment of the present disclosure.

The following formulations in Table 1 were made with different surface additives at 1 wt % of the total imaging layer. The goal was to determine the effect of no additive vs. additives on print time.

TABLE 1

Formulation with different surface additives

| | MK7311-1 | MK7311-2 | MK7311-3 | MK7311-4 | MK7311-P |
|---|---|---|---|---|---|
| MK7311-P | 49.50 | 49.50 | 49.50 | 49.50 | remainder |
| Foamblast 20F | 0.50 | | | | |
| BYK 1790 | | 0.50 | | | |
| Silmer ACR DI-10 | | | 0.50 | | |
| Ebecryl 350 | | | | 0.50 | |
| Total | 50.00 | 50.00 | 50.00 | 50.00 | 50.00 |

Figure 3:
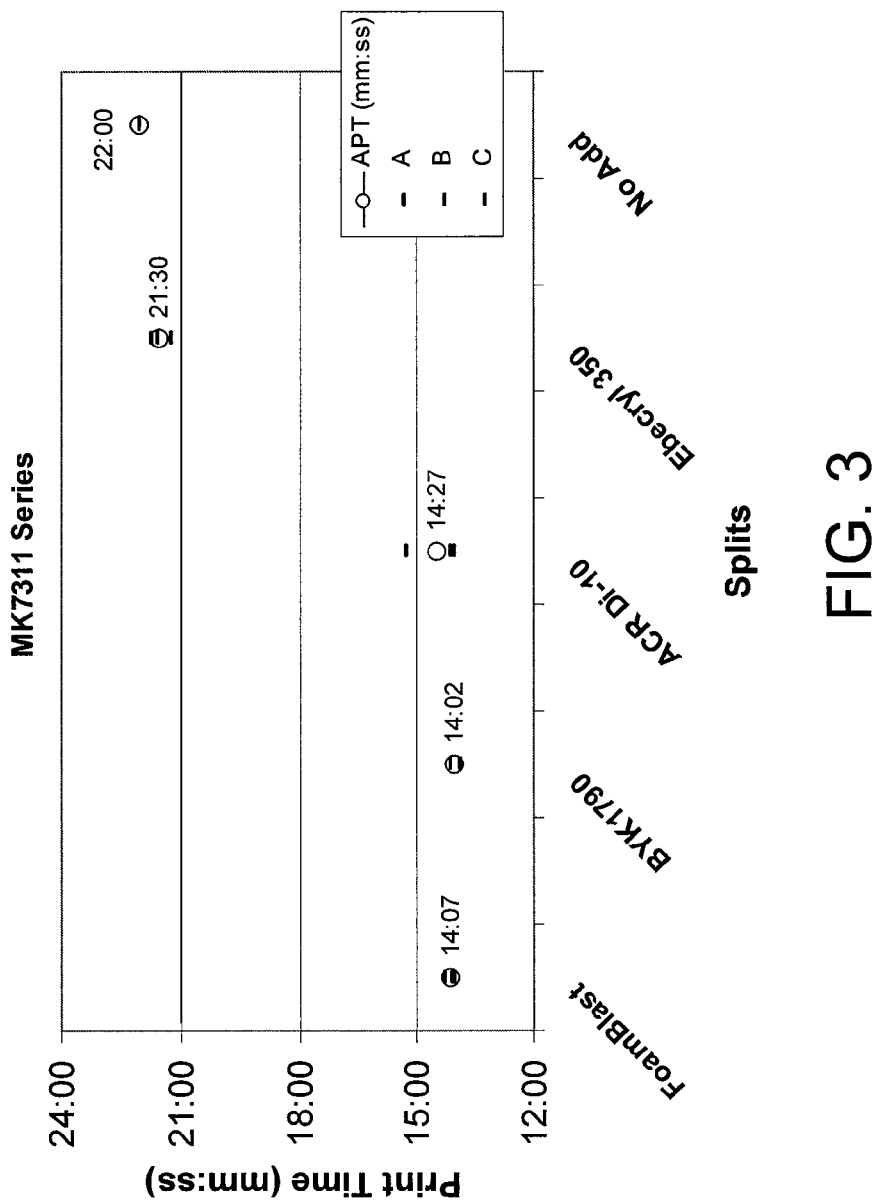
FIG. 3 is a graph that illustrates actual print time vs. surface additive type for an embodiment of the present disclosure.

FIG. 3 illustrates actual print time vs. surface additive type. As seen in FIG. 3, samples with no surface additive and Ebecryl 350 resulted in over 20 minutes of print time. Other surface additives were in the 14 minutes range. Each sample was replicated three times (A, B, and C)

EXAMPLE 2

The following is an illustrative example of an embodiment of the present disclosure.

The following formulations in Table 2 were made with different surface additives at different concentrations of the total imaging layer.

Figure 4:
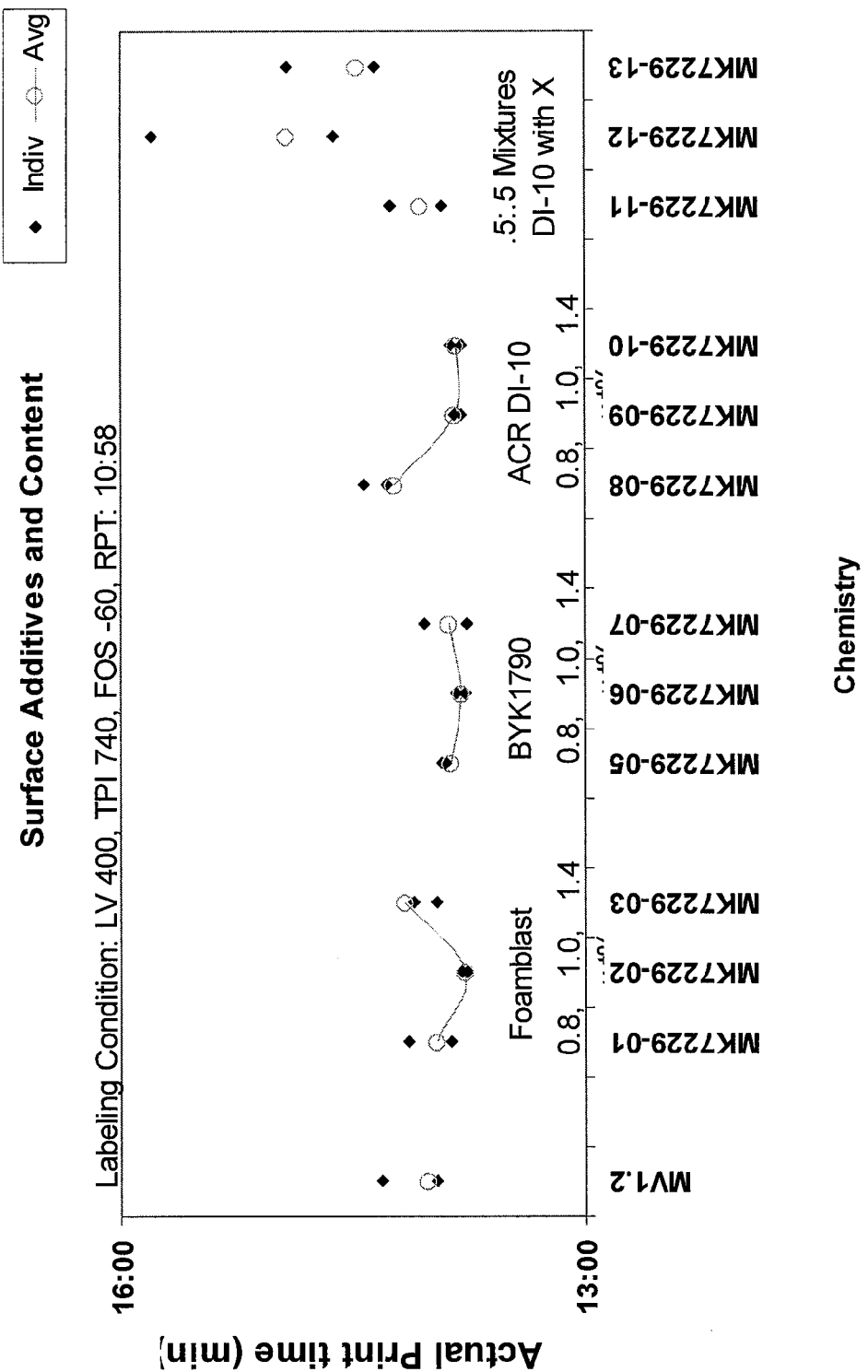
FIG. 4 is a graph that illustrates actual print time vs. surface additive type.

As seen in FIG. 4, samples with a mixture of surface additives resulted in longer print time with more variation. In samples 11 to 13, it is seen how by introducing non-compatible surface additives (ACR Di-50, ACR A0, and Silsurf A004) the print time becomes erratic and increases. Samples prepared with different concentrations based on single surface additive show slight variation in print time as a function of concentration.

EXAMPLE 3

The following is an illustrative example of an embodiment of the present disclosure.

The following formulations in Table 3 were made with different surface additives at 0.8 wt % of the total imaging layer

TABLE 3

| Base formulation | |
|---|---|
| MK7134 | Baseline |
| SR506 | 23.25 |
| Ebecryl 1040 | 12.75 |
| SR833 | 5.1 |
| Eb605 | 1.02 |
| Paraloid B-60 | 4.08 |
| Total Lacquer | 46.2 |
| SDP | 3.8 |

TABLE 2

Formulation based on different surface additives and different concentrations in imaging layer

| MK7229 | #1 | #2 | #3 | #4 | #5 | #6 | #7 | #8 | #9 | #10 | #11 | #12 | #13 |
|---|---|---|---|---|---|---|---|---|---|---|---|---|---|
| SR506 | 27.06 | 26.95 | 26.73 | BLANK | 27.06 | 26.95 | 26.73 | 27.06 | 26.95 | 26.73 | 27.06 | 26.95 | 26.73 |
| Ebecryl 1040 | 12.3 | 12.25 | 12.15 | | 12.3 | 12.25 | 12.15 | 12.3 | 12.25 | 12.15 | 12.3 | 12.25 | 12.15 |
| SR833S | 4.92 | 4.9 | 4.86 | | 4.92 | 4.9 | 4.86 | 4.92 | 4.9 | 4.86 | 4.92 | 4.9 | 4.86 |
| Ebecryl 605 | 0.984 | 0.98 | 0.972 | | 0.984 | 0.98 | 0.972 | 0.984 | 0.98 | 0.972 | 0.984 | 0.98 | 0.972 |
| Paraloid B-60 | 3.936 | 3.92 | 3.888 | | 3.936 | 3.92 | 3.888 | 3.936 | 3.92 | 3.888 | 3.936 | 3.92 | 3.888 |
| Total Lacquer | 49.2 | 49 | 48.6 | | 49.2 | 49 | 48.6 | 49.2 | 49 | 48.6 | 49.2 | 49 | 48.6 |
| SDP | 3.8 | 3.8 | 3.8 | | 3.8 | 3.8 | 3.8 | 3.8 | 3.8 | 3.8 | 3.8 | 3.8 | 3.8 |
| D8 | 11.2 | 11.2 | 11.2 | | 11.2 | 11.2 | 11.2 | 11.2 | 11.2 | 11.2 | 11.2 | 11.2 | 11.2 |
| LPI | 7 | 7 | 7 | | 7 | 7 | 7 | 7 | 7 | 7 | 7 | 7 | 7 |
| C715-Alloy | 3 | 3 | 3 | | 3 | 3 | 3 | 3 | 3 | 3 | 3 | 3 | 3 |
| BK400 (Lot #RK26-100) | 25 | 25 | 25 | | 25 | 25 | 25 | 25 | 25 | 25 | 25 | 25 | 25 |
| Foamblast 20F | 0.8 | 1 | 1.4 | | | | | | | | | | |
| BYK1790 | | | | | 0.8 | 1 | 1.4 | | | | | | |
| Silmer ACR Di-10 | | | | | | | | 0.8 | 1 | 1.4 | 0.5 | 0.5 | 0.5 |
| Silmer ACR DI-50 | | | | | | | | | | | 0.5 | | |
| Silmer ACR A0 | | | | | | | | | | | | 0.5 | |
| Silsurf A004 | | | | | | | | | | | | | 0.5 |
| Total | 100 | 100 | 100 | | 100 | 100 | 100 | 100 | 100 | 100 | 100 | 100 | 100 |

TABLE 3-continued

| Base formulation | |
|---|---|
| MK7134 | Baseline |
| D8 | 11.2 |
| LPI | 7 |
| YKR5010 (Slurry in SR506) | 6 |
| BK400 (Lot #RK26-72) | 25 |
| Surface additives | 0.8 |
| Total | 100 |

Where surface additives were BYK088, BYK1790 and BYK356.

| MV1.2 | Control |
|---|---|
| MK7134-2 | BYK088 |
| MK7134-3 | BYK 1790 |
| MK7134-4 | BYK356 |

Figure 5:
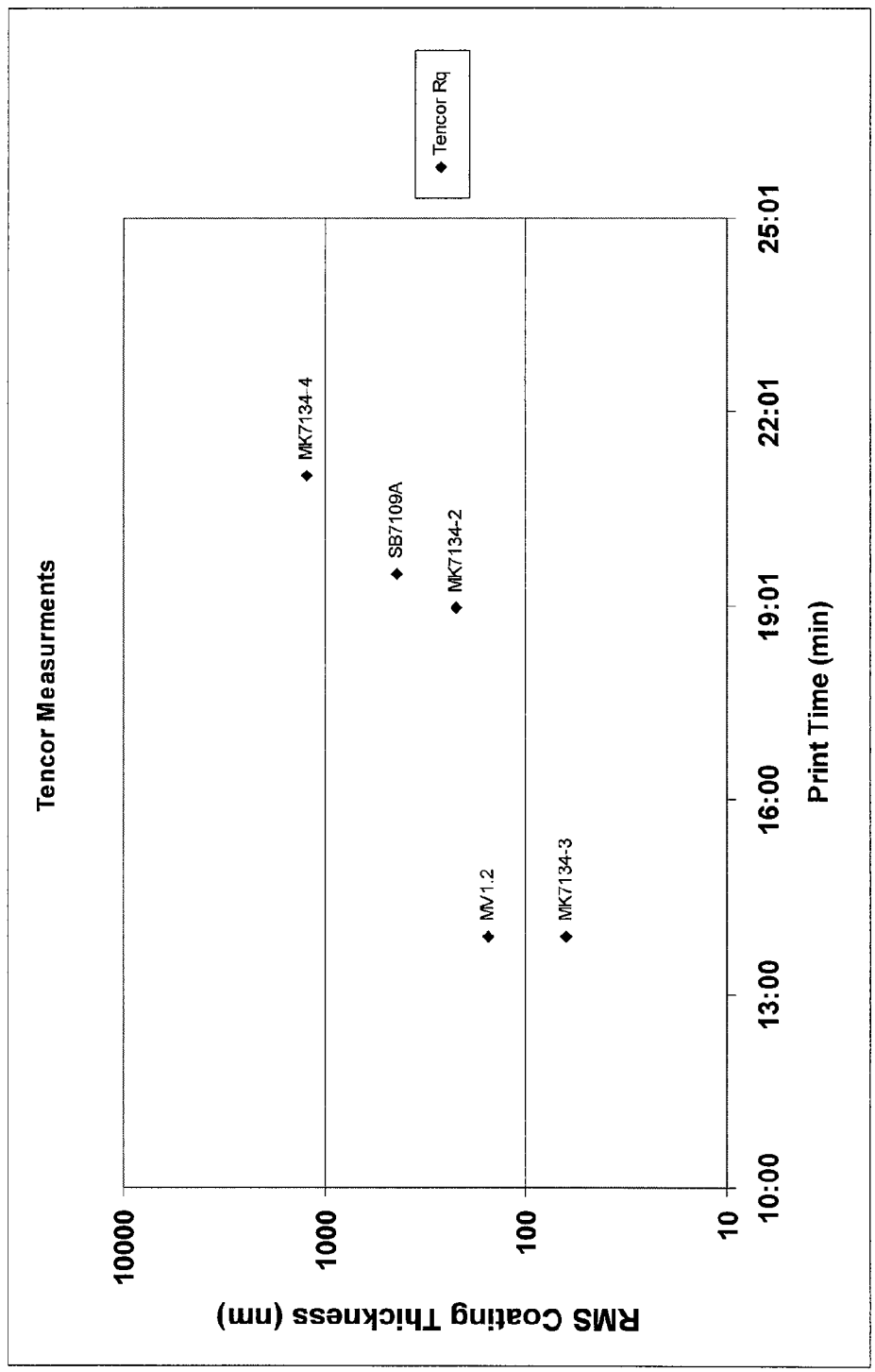
FIG. 5 is a graph that illustrates the root-mean-square of coating thickness vs. printing time.

As seen in FIG. 5, samples with root-mean-square value (indication of topography variation) greater than 200 nm show marked increase in print time.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An optical disk comprising:
a substrate having a first side and a second side, wherein the first side stores digital data, wherein the second side includes an imaging layer, wherein the imaging layer includes:
a matrix;
a radiation-absorbing compound;
an activator;
a surface additive; and
a color former.

2. The optical disk of claim 1, wherein the surface additive is selected from: silicon based surfactants, silicone free additives, additives having repeat units of dimethyl siloxane, which is acrylate capped on both ends, or combinations thereof.

3. The optical disk of claim 1, wherein the surface additive is about 0.01 wt % to 10 wt % of the imaging layer.

4. The optical disk of claim 1, wherein the surface additive is polydimethylsiloxane, and the content is about 0.6 wt % to 1 wt % of the imaging layer.

5. The optical disk of claim 1, wherein the surface additive is a silicone free additive that is a mixture of foam killing hydrocarbons, and the content is about 0.6 wt % to 1.5 wt % of the imaging layer.

6. The optical disk of claim 1, wherein the surface additive is a di-acrylated polydimethylsiloxane additive, wherein the content is about 1 wt % to 1.5 wt % of the imaging layer.

7. The optical disk of claim 1, wherein the surface additive is about 0.01 wt % to 1.5 wt % of the imaging layer.

8. The optical disk of claim 1, wherein the surface of the second side is about 500 to 1000% less rough than a surface of a second side of another optical disk having an imaging layer that does not include the surface additive.

9. The optical disk of claim 1, wherein the surface additive is modified with a group selected from: alkyl polyethylene oxides, alkyl phenyl polyethylene oxides, polyethylene oxide (PEO) block copolymers, acetylenic PEO, PEO esters, PEO amines, PEO amides, dimethicone copolyols, or combinations thereof.

10. A method for preparing an optical disk including an imaging layer, the method comprising:
providing a matrix;
mixing a radiation-absorbing compound, an activator, a surface additive, and a color former, in the matrix to form a matrix mixture; and
disposing the matrix mixture onto a substrate to form the imaging layer.

11. An imaging layer comprising:
a matrix including a monoacrylate and a diacrylate, wherein the monoacrylate is about 13 to 45 wt % of the imaging layer, wherein the diacrylates is about 2 to 33 wt % of the imaging layer;
a radiation-absorbing compound, wherein the radiation-absorbing compound has a solubility of at least 2% by weight in the matrix;
an activator;
a surface additive, wherein the surface additive is selected from: silicon based surfactants, silicone free additives, additives having repeat units of dimethyl siloxane, which is acrylate capped on both ends, or combinations thereof, wherein the surface additive is about 0.01 wt % to 10 wt % of the imaging layer; and
a color former.

12. The imaging layer of claim 11, wherein the surface additive is
polydimethylsiloxane, and the content is about 0.6 wt. % to 1 wt % of the imaging layer.

13. The imaging layer of claim 11, wherein the surface additive is silicone free additive that is a mixture of foam killing hydrocarbons, and the content is about 0.6 wt % to 1.5 wt % of the imaging layer.

14. The imaging layer of claim 11, wherein the surface additive is a di-acrylated polydimethylsiloxane additive, wherein the content is about 1 wt % to 1.5 wt % of the imaging layer.

* * * * *

UNITED STATES PATENT AND TRADEMARK OFFICE
CERTIFICATE OF CORRECTION

| | | |
|---|---|---|
| PATENT NO. | : 8,722,167 B2 | Page 1 of 1 |
| APPLICATION NO. | : 12/999244 | |
| DATED | : May 13, 2014 | |
| INVENTOR(S) | : Mehrgan Khavari | |

It is certified that error appears in the above-identified patent and that said Letters Patent is hereby corrected as shown below:

In the Claims

Column 16, line 43, in Claim 11, delete "activator:" and insert -- activator; --, therefor.

Signed and Sealed this
Seventeenth Day of February, 2015

Michelle K. Lee
*Deputy Director of the United States Patent and Trademark Office*